Aug. 31, 1965  A. LITCHARD  3,203,154
CARTON MAKING, FILLING AND CLOSING MACHINE
Filed Oct. 31, 1961  10 Sheets-Sheet 1
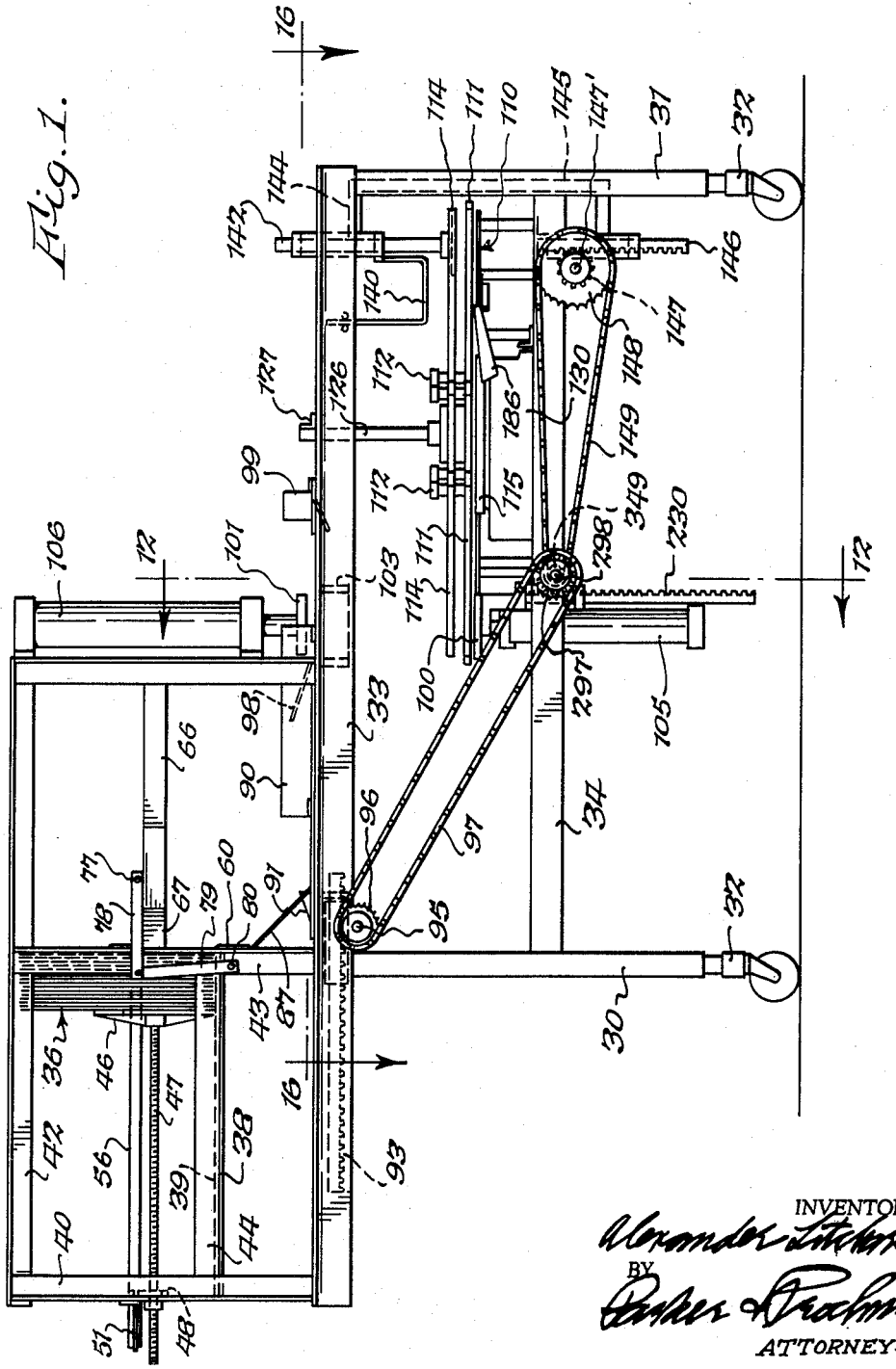

Aug. 31, 1965   A. LITCHARD   3,203,154
CARTON MAKING, FILLING AND CLOSING MACHINE
Filed Oct. 31, 1961   10 Sheets-Sheet 2
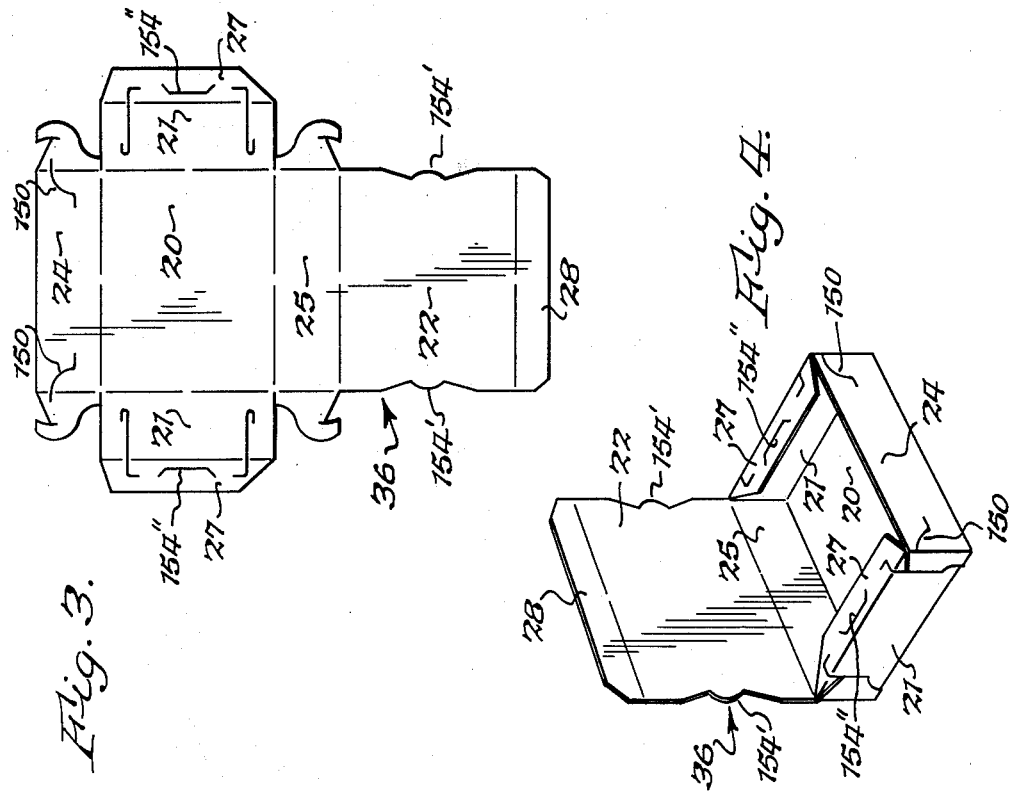
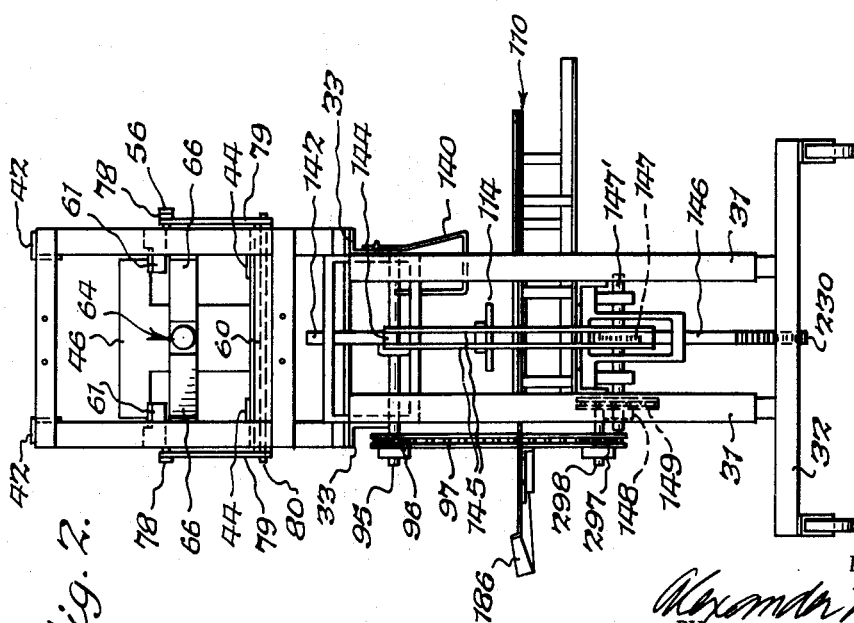
INVENTOR.
Alexander Litchard
BY
Parker Brockman,
ATTORNEYS.

Aug. 31, 1965    A. LITCHARD    3,203,154
CARTON MAKING, FILLING AND CLOSING MACHINE
Filed Oct. 31, 1961    10 Sheets-Sheet 3

INVENTOR.
Alexander Litchard
BY
Parker & Pinchman
ATTORNEYS.

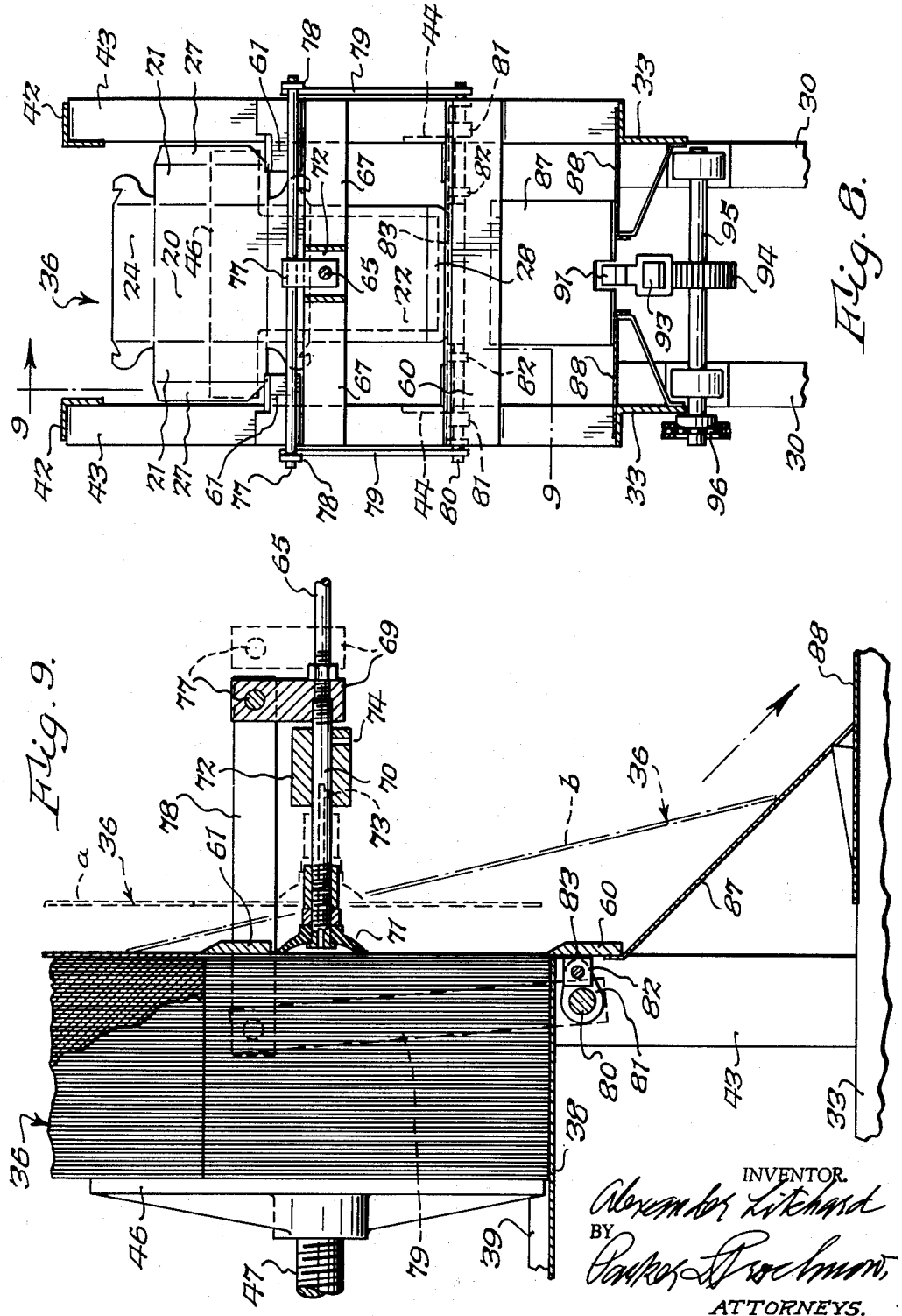

Aug. 31, 1965  A. LITCHARD  3,203,154
CARTON MAKING, FILLING AND CLOSING MACHINE
Filed Oct. 31, 1961  10 Sheets-Sheet 5
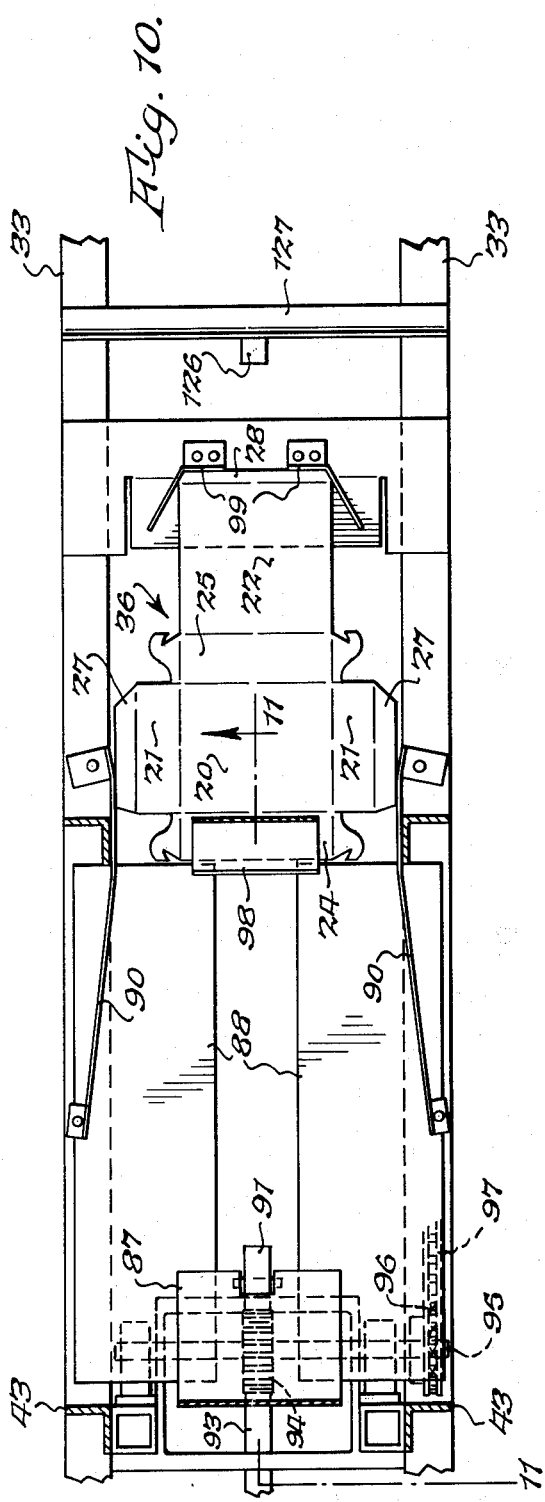
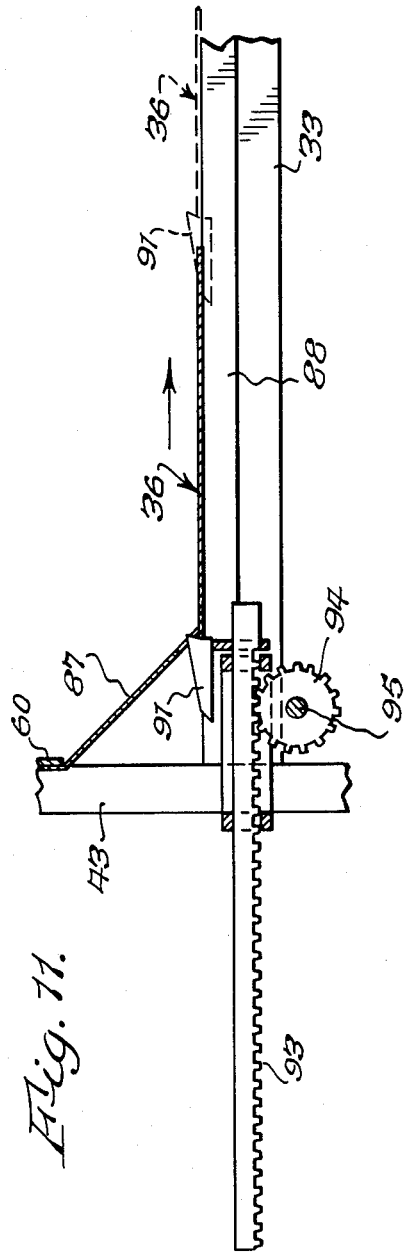
INVENTOR.
Alexander Litchard
BY
Parker & Pyckman,
ATTORNEYS.

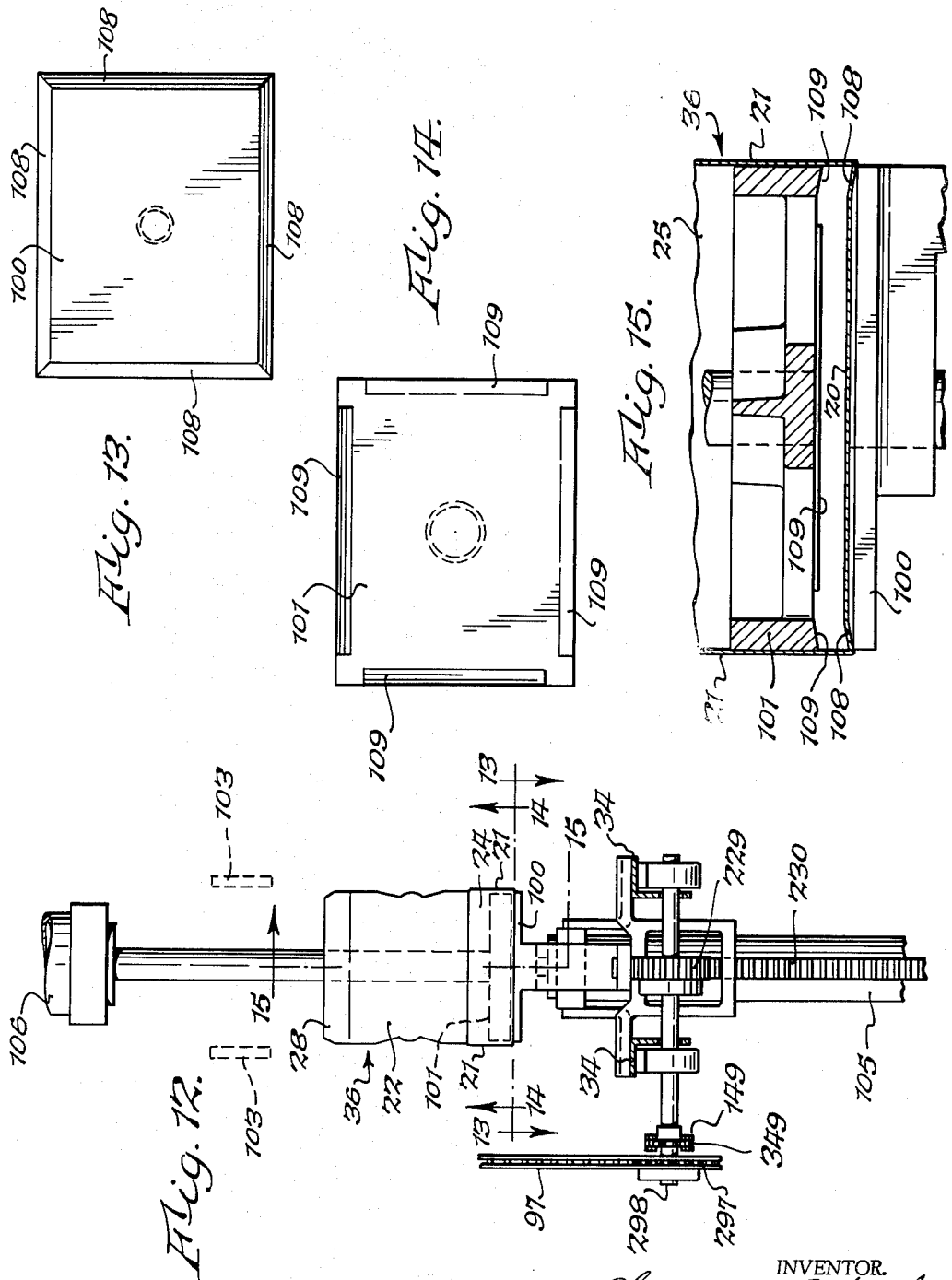

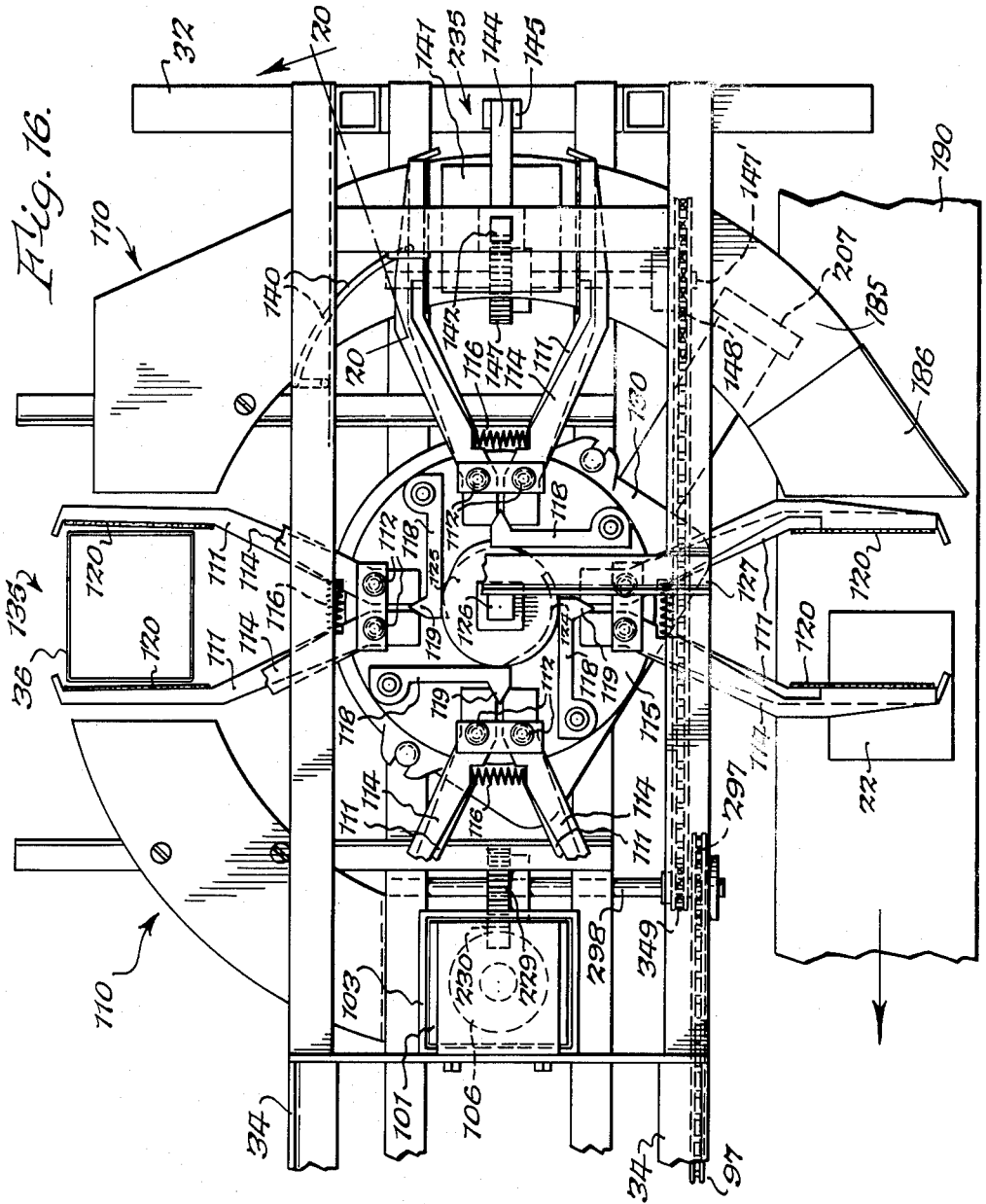

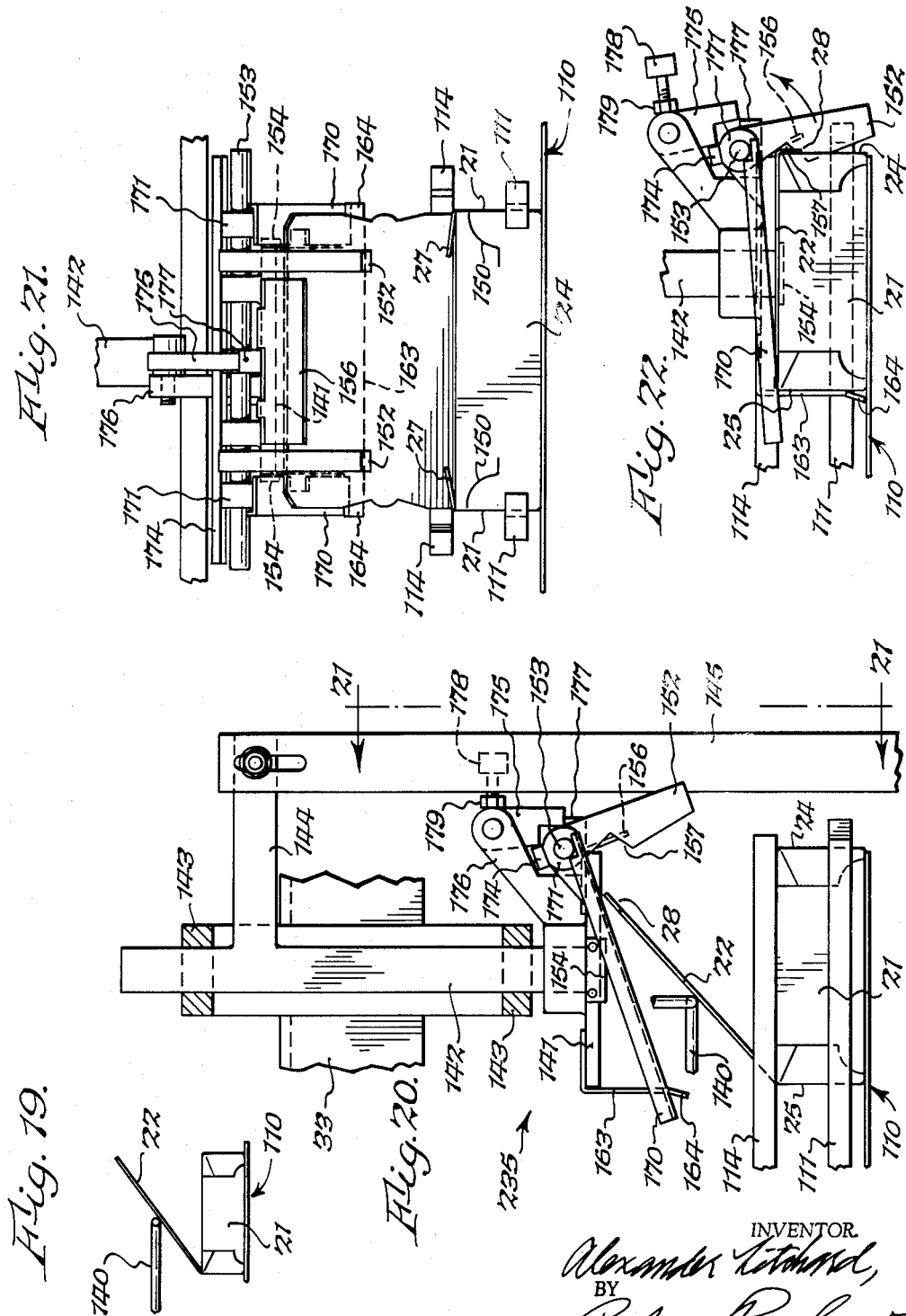

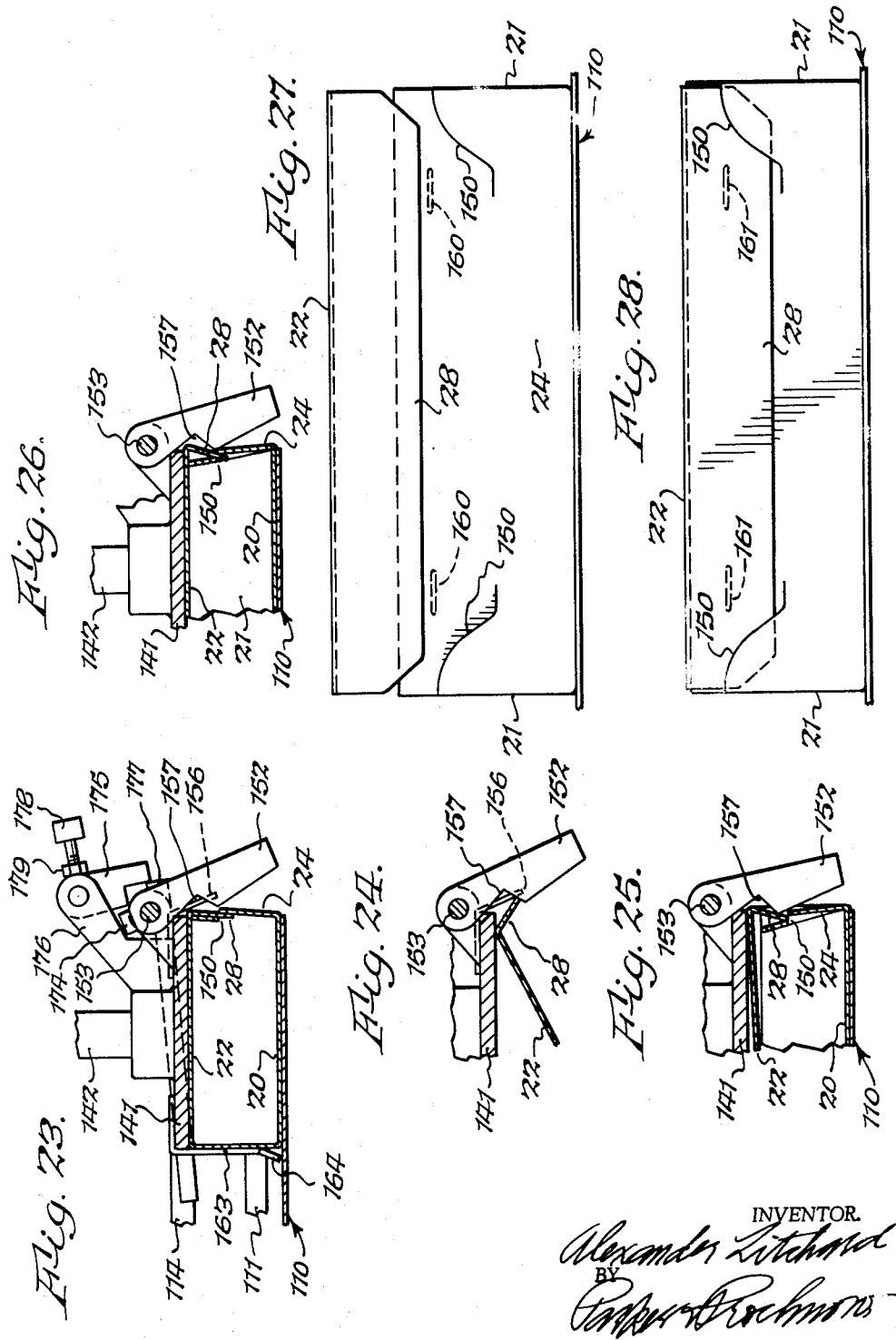

and closing machine embodying this invention.
United States Patent Office 3,203,154
Patented Aug. 31, 1965

3,203,154
CARTON MAKING, FILLING AND CLOSING
MACHINE
Alexander Litchard, 322 N. Main St., Wellsville, N.Y.
Filed Oct. 31, 1961, Ser. No. 148,945
4 Claims. (Cl. 53—75)

This invention relates to machines for use in packing and freezing plants for filling cartons with beans, peas or similar vegetables, although machines of this type may be used for packaging other materials.

One of the objects of this invention is to provide a machine of this type which is substantially complete in itself, in that it forms cartons or containers from blanks, and shapes the same to receive the material, the quantity of which may be weighed or otherwise determined, and which then closes the filled cartons.

Another object of this invention is to provide a machine of this type with improved means for forming a carton from a blank of the same and presenting the same in open position for filling the contents thereof.

Another object is to provide a machine of this kind with means of improved construction for closing the cartons after they have been filled.

A further object is to provide a machine of this type with means for shaping the sides of the carton in such a manner that these sides will be approximately perpendicular to the bottoms of the cartons and will remain in such position while being filled and closed.

It is also an object of this invention to provide a machine of this type with means of improved construction for removing the flat blanks from a stack and advancing them correctly into position to be folded.

Another object is to provide an efficient and compact machine of this type which can be readily removed from one position to another.

In the accompanying drawings which illustrate by way of example one embodiment of my invention:

FIG. 1 is a side elevation of a carton making, filling and closing machine embodying this invention.

FIG. 2 is an end view thereof.

FIG. 3 is a face view of a blank of one type on which my improved machine is adapted to operate.

FIG. 4 is a perspective view of a carton after it has been formed and in position as if filled.

FIG. 8 is a sectional elevation thereof on line 8—8, FIG. 5.

FIG. 9 is a fragmentary, sectional elevation on an enlarged scale on line 9—9, FIG. 8.

FIG. 10 is a top plan view, partly in section, of the blank delivery portion of the machine just previous to forming.

FIG. 11 is a sectional elevation thereof on line 11—11, FIG. 10.

FIG. 12 is a fragmentary, sectional elevation thereof on line 12—12, FIG. 1.

FIG. 13 is a top plan view of the part which cooperates with the bottom of the box during the first forming operation, this view being taken on line 13—13, FIG. 12.

FIG. 14 is a similar view showing the bottom face of the ram or mandrel which cooperates with the plate shown in FIG. 13, the view being taken on line 14—14, FIG. 12.

FIG. 15 is a fragmentary, sectional elevation on line 15—15, FIG. 12.

FIG. 16 is a top plan view of the rear portion of the machine including the turntable on which the forming, filling and closing of the carton is effected, this view being taken approximately on line 16—16, FIG. 1.

FIG. 17 is a face view of a stationary cam which controls the placing of the covers on the cartons.

FIG. 18 is a face view of another stationary cam which cooperates with the cartons for moving them along an indexing table.

FIG. 19 is a side elevation of a container showing the first step in the closing of the lid of the container after the same has been filled.

FIG. 20 is a fragmentary, sectional elevation on line 20—20, FIG. 16.

FIG. 21 is a fragmentary elevation taken on line 21—21, FIG. 20.

FIG. 22 is a fragmentary elevation showing parts of the lid closing mechanism in one position.

FIG. 23 is a sectional view of the lid closing mechanism showing the position of the parts after the lid has been moved into its closing position.

FIGS. 24–26 are fragmentary views of the lid closing mechanism showing the parts of the same in successive steps in the lid closing operation.

FIG. 27 and 28 are end views of the carton showing in FIG. 27 the lid just before it is moved into its final position and in FIG. 28 the final position of the lid.

Figure 7:
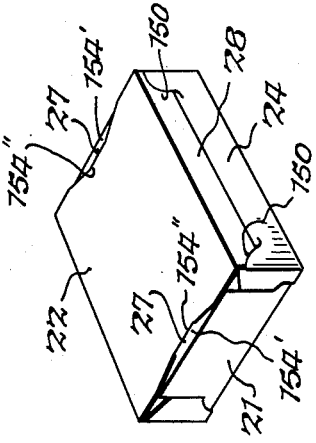
FIG. 7 is a perspective view of a carton after it has been closed.

I have illustrated my machine as used in connection with cartons such as shown in FIGS. 3, 4 and 7, although it will be understood that my machine may operate in connection with cartons of different designs. In FIG. 3 I have shown the carton blank 36 which has been cut out to the correct shape, scored and perforated. This carton has a bottom 20, sides 21, a cover or lid 22, and front and back walls 24 and 25. The sides 21 are provided at their upper edges with dust flaps 27 and the top is provided with a tuck edge 28 formed to be tucked into interlocking relation with part of the front wall 24.

The machine shown in the particular embodiment of my invention shown in the drawings is mounted on pairs of upright legs 30 and 31. These pairs of legs terminate at their lower ends in cross bars 32 having rollers or casters secured thereto to enable the machine to be moved about from place to place where it may be needed. The legs are connected by longitudinally extending upper and lower frame members 33 and 34. The frame members 33 extend beyond one end of the main machine frame and support a magazine of carton blanks 36 from which the blanks are fed, one at a time, for processing. These blanks are arranged with their tuck edges 28 lowermost and are supported on a plate 38 provided with guide rails 39, FIGS. 5 and 6, which are spaced to engage the opposite ends of the tuck edges to hold the stack of blanks in place on the magazine. This magazine includes a frame having upright members 40 and 43 secured at their lower ends to the frame members 33 and having their upper ends connected by means of longitudinally extending angle bars 42. Short, upright frame members 43 are provided at the front end of the plate 38, the sides of which are held on the upright frame members 40 and 43 by means of angle bars 44. Any other means for constructing the magazine to hold and feed the stack of blanks may be provided.

The blanks may be fed lengthwise of the machine in any suitable manner, for example, by means of a backing or pusher plate 46 formed to engage the rearmost blank of the stack and advance the same forwardly approximately at the rate at which the blanks are moved in the front of the magazine. In the construction shown, this pusher plate is connected with the front end of a screw 47 having its front end fixedly mounted on the pusher plate 46 to move the same forwardly and provided at the rear end of the magazine with a ratchet 48 having a threaded engagement with the screw 47 and mounted against longitudinal movement by means of a cross frame member 49.

Figure 5:
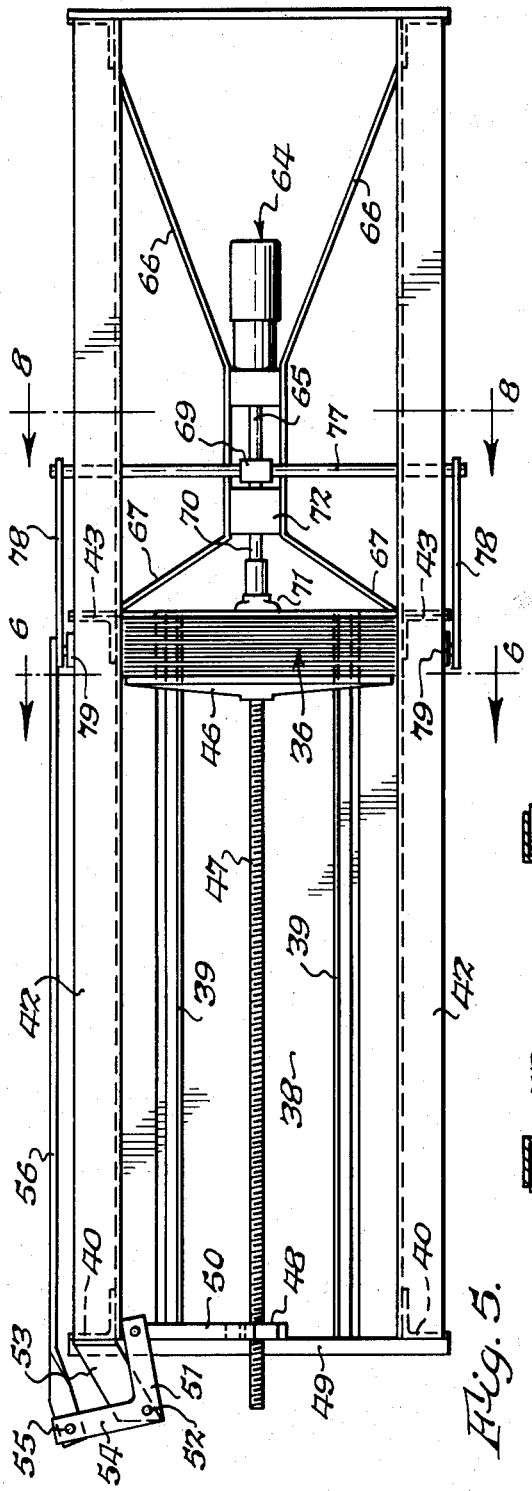
FIG. 5 is a top plan view on an enlarged scale of the portion of the machine which deals with the individual dispensing of one blank at a time.
Figure 6:
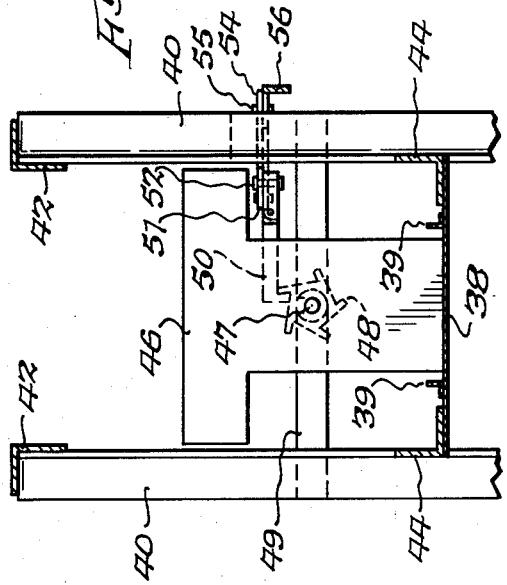
FIG. 6 is a sectional elevation thereof on line 6—6, FIG. 5.

The ratchet may be actuated in any suitable or desired manner for advancing the screw 47 and in the construction shown for this purpose, see particularly FIGS. 5 and 6, a pawl 50 is provided which has a hook end portion to engage the outwardly extending arms of the ratchet. This pawl is pivoted at one end thereof on a bell crank lever 51 pivoted at 52 on an arm 53 extending outwardly from the frame of the magazine. The bell crank lever also has a leg 54 pivoted at 55 on the end of a rod 56 which is movable in the direction of its length to swing the bell crank lever sufficiently to move the pawl to turn the ratchet 48 through a fraction of a revolution in a direction to advance the screw shaft 47 to an extent equal to the thickness of the carton blanks in the magazine. Any other means for advancing the cartons may be provided if desired.

The front or leading carton blank in the magazine may be releasably held in any suitable manner. Preferably suitable stops or holding members are provided which release the foremost blank when the same is raised to a slight extent. For this purpose I have provided at the lower edge of the front of the magazine a holder or stop 60 which is mounted so as to hold the lower or tuck edge of the foremost carton against further advancing, and a pair of similar holders or stops 61 which cooperate with the lower edges of the sides 21 of the carton blank. Consequently the foremost carton blank, when raised to a slight extent, will be released from the stops. I also provide means for temporarily holding the foremost blank when released from the remainder of the stack.

The releasing of the foremost carton blank by pushing it upwardly, is effected through mechanism including a suitable air motor 64 having a piston, not shown, connected with a piston rod 65. This air motor may be mounted on suitable braces or struts 66 and 67 secured to rigid frame parts of the machine, FIG. 5. The piston rod is secured to a cross head adapter 69 to which a piston rod extension 70 is also secured. This piston rod extension, which may be made in two parts, connected by a coupling, is provided at its rear end with a suction cup 71, and the rear part of the extension is provided with a bore connecting with the suction cup and extending through a stationary valve member 72. The bore of the piston rod extension is provided with a laterally extending passage 73 and the valve 72 is provided with an opening or port 74. Consequently, when the piston rod and its extension move the suction cup 71 rearwardly, and then again forwardly, a partial vacuum is formed within this cup 71 and in the bore of the piston rod extension. Upon forward motion of the suction cup, the released blank is moved forwardly approximately into position a shown in broken lines in FIG. 9. When the piston rod extension has moved forwardly to the desired extent, the passage 73 will coincide with the port 74 of the stationary valve member and thus break the suction with the cup 71 to release the carton blank held thereby. The carton is then free to drop as indicated at b, FIG. 9. The suction cup my be releasably secured on the piston rod extension in any suitable manner to permit replacement of the same.

The air motor 64 is also preferably employed for releasing the foremost blank from the stack in the magazine and, for this purpose, the crosshead adapter 69 which moves the piston rod 65 is connected to a transversely extending rod 77, FIGS. 5 and 9, the ends of which are pivotally connected to links 78 extending rearwardly and having their rear ends connected with upright levers 79, the lower ends of which are pivoted at 80 on the frame of the machine. These levers are rigidly connected to short arms 81, the outer ends of which are connected to slides 82 having a blade 83 secured thereto which is mounted to slide on the rear face of the stop member 60. This blade is of a thickness substantially equal to the thickness of the blanks, and it will be readily seen that as the lever arms 79 swing rearwardly, the blade 83 would move upwardly to a sufficient extent to move the foremost blank upwardly clear of the holding members or stops 60 and 61. At the end of this movement, the suction cup 71 will engage the foremost blank so that the same will be held and moved forwardly clear of the holding member 61 when the suction cup is moved forwardly by the piston rod 65. The suction cup will then be in the position shown in broken lines in FIG. 9, at which time the lateral passage 73 will move into engagement with the port 74 in the valve member, thus releasing the blank so that the same falls downwardly.

It will be noted that one of the links 78 is also connected with the link 56, FIG. 5, which extends rearwardly into pivotal engagement with the arm 54 of the bell crank for actuating the ratchet 48. Consequently the ratchet advances the back plate 46 at the time that the foremost blank is moved from the stack.

The retraction of the piston and the piston rod 65 of the air motor to its original position also results in the withdrawal of the carton elevating members 83 into a position below the next carbon blank.

The machine is provided with an inclined chute 87 upon which the lower edge of the blank drops and is deflected forwardly to a pair of suitable supporting skids 88 which causes the descending blank to assume a horizontal position on which the blank is advanced to the mechanism for forming the same into an open carton. It is necessary, of course, that the blank be positioned accurately on the skids 88, and for this purpose guides 90, FIG. 10, are mounted at opposite sides of the skids to engage the sides of the blanks to center the same on the skids. Each blank is advanced along the skids by means of a pusher 91 movable in the space between the skids. The side guides 90 are also preferably adjustably mounted on the machine so that they can be positioned to accommodate blanks of different sizes or shapes, with which my improved machine may cooperate.

The pusher 91 may be advanced and retracted in any suitable manner and in the construction illustrated, FIG. 1, the pusher is supported on a rack 93 slidably mounted on the frame of the machine and moved in either direction by means of a gear 94 secured on a shaft 95 rotatably mounted on the machine. This shaft also has secured thereto a sprocket gear 96 which cooperates with a sprocket chain 97. Other means may be provided for accurately guiding the blanks into position to be formed into cartons including, for example, the deflector 98 which keeps the leading edge of the blank down to enable it to pass under a ram 101 when moving into its next position. Also there is provided a pair of stops 99, FIG. 10, which limit forward movement of the blank by the pusher 91 and also guide their leading tuck edge 28 and flap 22 into a centered alinement with the carton forming means.

In the next operation of the blank while in the position shown in FIG. 10, the bottom 20 thereof is engaged from above by means of a ram 101 from below by a backing plate 100 so that the blank is firmly gripped between the ram and backing plate. The blank thus held is moved through a forming die or head 103, FIG. 1, which bends the sides and ends of the carton blank upwardly and passes the hook-shaped fingers on the front and back walls 24 and 25 through the slots in the sides 21 to interlock these walls. The mechanism for interlocking these walls of the blanks does not constitute a part of this invention and is therefore not shown or described herein. However, it is a part of my invention to form the bottoms of the cartons so that the side walls thereof will extend substantially perpendicular to the bottoms.

The ram and the backing plate may be moved into gripping engagement with a carton blank in any suitable manner. In the construction shown, the backing plate 100 is moved upwardly into position to receive the carton blank as it is fed into its correct position, and the ram 101 will then move downwardly into clamping engagement with the carton blank. The backing plate is moved upwardly by means of pneumatic pressure in a cylinder 105 and the ram 101 is moved downwardly by means of a pneumatic motor including a cylinder 106. For forming the blank into an open carton, the air pressure in the cylinder 106 moves the backing plate downwardly against pressure in the cylinder 105 which has a relief valve which is actuated after the backing plate is in its upper position for gradual bleeding of the pressure fluid from cylinder 105, for permitting downward movement of the backing plate without materially reducing the pressure exerted by the backing plate on the blank.

In order to have the sides of the carton extend vertically from the bottom thereof, I provide the backing plate 100 at the four sides thereof with downwardly sloping edges 108, FIG. 13, and I provide the bottom of the ram with sloping edge portions 109, FIG. 14, which terminate short of the corners of the ram. Consequently, when the upper plate 101 of the ram is pressed downwardly toward the backing plate 100, the bottom of the carton will have its edges extending downwardly below the flat, middle portion of the carton bottom, and thus form with the sides of the carton an angle less than 90 degrees, as shown in FIG. 15. Consequently, when the pressure on the carton is released, the resilience of the material will cause the edges of the bottom to move upwardly sufficiently to extend parallel to the middle portion of the carton bottom, thus causing the sides of the carton to extend in a direction perpendicular to the bottom of the same. It will be noted that the corners of the plate 101 of the ram are not bevelled or extended downwardly so that the four corners of the bottom of the carton are not put under pressure, thereby relieving them from creasing or buckling under pressure.

After the ram has pushed the backing plate to its lowest position, it will be withdrawn from the carton and the carton will then be approximately on the level of a stationary indexing table 110 made in segments, FIG. 16. This table has four stations and the cartons are moved successively to the different stations by means of carton moving pincers or grippers.

I have provided four of these carton-moving grippers or pincers arranged 90 degrees from each other, and another set of pincers is provided, each mounted directly above the carton-moving pincers, these other pincers being employed in connection with closing of the cartons. Each of the carton-moving pincers has two arms 111 extending at opposite ends of the cartons and movable toward and from each other to grasp a carton, and these arms are pivoted at 112 on a rotary table or plate 115. The other pincers have arms 114 which are also pivoted on the same pivots 112. In each set of pincers the arms are yieldingly moved apart by means of coil springs 116 arranged between the arms of the pincers, as clearly shown in FIG. 16.

The arms of the pincers are moved toward each other by means of wedge members 118, each of which is pivoted at one end on the plate or table 115 and provided at the other ends with wedge-shaped parts 119 formed to fit between the ends of the pincer arms which are at the sides of the pivots 112 opposite to the carton-engaging ends of the arms. Consequently, when these wedge-shaped members 119 move into the spaces between the inner ends of the arms, the outer ends of these arms will be forced toward each other. The arms 111 of the carton-engaging pincers preferably have friction inserts or faces 120 made of some material such, for example, as foam rubber and arranged at the portions of the arms which contact with the cartons.

The actuation of the carton-engaging pincers is effected by means of a stationary cam 124 which is mounted to coincide with the axis of rotation of the table 115 and the face of which is in engagement with the wedge members 118 adjacent to their wedges 119. The other pincers, including the arms 114, are engaged by wedge members similar to the wedge members 118, and these other wedge members are engaged by means of an upper stationary cam 125. The two cams are secured to each other and held in stationary position in any suitable manner, for example, by means of an upright stud or projection 126 of noncircular shape, square, for example, as in the construction shown, which is rigidly secured to a cross rod 127, FIGS. 1 and 16. The ends of this rod are secured to frame members 33. Any other means for mounting these cams may be employed.

The movement of the pincers is effected by rotation of the plate or table 115 which is constructed to stop at stations spaced 90 degrees apart. This table is turned intermittently by any suitable mechanism contained in the housing 130 mounted on the frame of the machine. Since this mechanism for intermittently turning the table 115 through 90 degrees and then stopping until again actuated is a well known construction and purchasable on the open market, a detailed description is consequently not deemed necessary.

After a carton has been positioned by the backing plate 100 in correct position to the indexing table, movement of the rotary table 115 commences and the arms of the lower set of pincers are consequently moved toward each other to grasp a carton which has been delivered to the backing plate. The turntable 115 then rotates through a quarter of a revolution which positions the carton at a filling and weighing station 135. When in this position the gripping arms of the carton-moving pincers are moved apart to release the carton and position the same on a platform of a scale so that the entire weight of the carton is supported by the scale. This releasing of the pincers is effected by means of a recess or notch 123 formed in the lower cam 124 which causes the wedge 119 to move out of engagement with the arms of the pincer and permits the spring 116 to move the arms apart, as shown in FIG. 16.

This scale may be of any suitable or desired construction such, for example, as shown in my copending application Ser. No. 63,324, filed Oct. 18, 1960. The means for feeding the material into the containers is not shown in the drawings since it may be of any suitable form such for example as shown in my copending application Ser. No. 16,815 filed March 22, 1960. The scale also has means for closing an electric circuit when the desired amount of weight has been acquired by the carton, and this circuit controls the operation of the apparatus, as will be hereinafter explained. A scale 136 is shown diagrammatically in FIG. 29, which also shows a switch 137 actuated by the scale and which closes a circuit when the desired weight has been attained by the carton. This circuit interrupts further feed of material to the carton so that the same is then ready to be moved to the next station. The start of the movement to the next station again results in the moving of the gripping arms of the carton-moving pincers into position to grip the carton for moving the same through 90 degrees to the next station.

In the course of this movement from the filling and weighing station, the carton is also closed by bringing the lid 22 down and interlocking it with other parts of the carton. After leaving the filling and weighing station 135, the lid 22 of the carton moves into contact with a lid-bending and deflecting member 140 which in the construction shown is in the form of a wire having a cam-shaped part along which the lid moves. During this movement the lid is bent from a substantially upright position to an inclined position shown in FIGS. 19 and 20, so that the lid can pass under a closure plate 141.

Also during this movement, the upper pincers 114 are closed by the action of the upper cam 125. These pincers engage the dust flaps 27 which extend upwardly from the ends 21 of the carton. The upper pincers fold the dust flaps inwardly under the lid and are released just before the carton stops at the third station 235. These upper pincers open much wider than the lower pincers and are clear of all other operations of the machine.

The closure plate is located at the third station 235 so as to be immediately above the filled carton when in this station and serves to press the lid of the carton down into its closed position. This closure plate is mounted on a vertical rod 142 guided for movement in a stationary bearing bracket 143 which is mounted on a frame member of the machine. The movement of the rod 142 is effected by means of a connecting member 145 of approximately U-shape having one arm 144 connected with the upright rod 142 and having another arm at the lower end thereof connected with a rack 146 which is reciprocated vertically by means of a gear 147 mounted on a shaft 147' on which a sprocket gear 148 is also mounted. The sprocket gear cooperates with a sprocket chain 149, FIG. 1.

During the downward movement of the lid by the closure plate, the part 28, which is bendably connected with the lid, is tucked into its final closing position by inserting the ends of this tuck member through the quarter circle cuts 150 in the front wall 24 of the carton. To do so, it is first necessary to press the portion of the front wall inwardly to open these cuts, and this is accomplished by means of a pair of keys 152 which are secured at their upper ends on a freely rotatable pivot pin 153 supported on brackets secured on the closure plate. As the closure plate advances farther into lid-closing position, the keys 152 come in contact with the tuck portion and bend it firmly into the open slots or cuts 150, whereupon the tuck portion locks firmly in these cuts because of the nature of their design, see FIGS. 20, 21 and 22.

Prior to the insertion of the tuck portions in the cuts of the front wall of the carton, this tuck portion is bent on its score line connecting it with the lid. This, in the construction shown, is effected by means of a tuck-bending plate 156 which may be secured on the closure plate and arranged between the keys 152. These keys have notches or recesses 157 in the faces thereof adjacent to the front of the carton which are formed to receive the tuck portions of the cartons. It will be noted in FIG. 20 that the tuck portion is about to engage the closure plate 141, which upon farther downward movement will deflect the tuck portion against the bending plate 156, whereupon it advances into contact with the lower edges of the recess 157 shown in FIG. 24. The lower edge of the tuck portion then moves out of the recess into position to enter the openings 150 in the front wall of the carton, as shown in FIG. 25, and FIG. 26 shows the carton finally closed. Similarly FIG. 27 shows a front view of the carton with the lower edges of the recess in the keys containing the front wall at 160 to open the slots 150, and FIG. 28 shows the final position of these edges at 161 in the positions shown in FIG. 26.

The shape of the keys is such that they hold the front side of the carton inwardly while the leading edge of the tuck portion descends and seeks the outside surface of the front side of the carton rather than going inside of the carton. In this way one piece of mechanism serves a multiple purpose.

During these various operations considerable pressure is exerted against the front of the carton, and to prevent shifting of the cartons in the pincers 111, I preferably provide a stop or brace plate 163 on the closure plate 141, positioned to engage the rear wall of the cartons in case the same are moved rearwardly. The lower edge of the stop plate is preferably inclined rearwardly to prevent this plate from contacting the upper edge of a carton while moving downwardly with the closure plate. This stop plate has laterally projecting parts 164 on the lower portion thereof, see FIG. 21.

In FIG. 23 I have shown the position of the keys after the tuck portions have been positioned on the front wall of the carton. The closure plate is then ready to move upwardly into position to operate on the next carton and in order to prevent the keys during this upward movement from damaging or upsetting the cartons, the following construction may be employed:

I provide at each side of the closure plate a pair of detents 170 which are secured at their upper ends to sleeves or bushings 171 to which a cross bar 174 is secured. These sleeves 171 are free to rotate on the shaft or pivot pin 153 to which the keys 152 are secured. These detents 170 normally rest on the lateral projections 164 of the brace or stop plate and thus occupy downwardly inclined positions until the closure plate moves downwardly sufficiently so that these detents contact with the container, whereupon they are swung upwardly about the pivot pin or shaft 153. When in this position, the detents 170 have moved the cross bar 174 into the position shown in FIG. 22, in which it engages a latch pawl 175 pivoted on a bracket 176, FIG. 21, also mounted on the closure plate. There is also provided a latch 177 secured to the pivot shaft 153 which is swung by the upward swinging of the detents 170 out of holding relation to the latch pawl 175 so that the keys 152 are free to move into positions to clear the carton. However, the movement of the keys is limited so that they will be in positions to act on the next carton, this being due to the fact that the detents 170 are restricted by the latch 177 engaging in the notch of the latch pawl 175.

There is also the possibility that the latch pawl 175 may not be properly balanced. To offset this possibility a set screw 178 is provided which is held firmly in adjusted position by a lock nut 179 to obtain the proper balance of the latch pawl.

At the same time the carton is closed, a pair of abutments 154, one on either side of the closure plate 141, as clearly shown in FIGS. 20, 21 and 22, engage the tabs 154' of the carton cover 22 and push them into the slots 154" in the dust flaps 27. When engaged these tabs 154' prevent distortion out of square of the carton as well as serving also to lock the cover 22 down onto the carton. This tab engagement is clearly shown in FIG. 7.

After the cartons have been closed at the third station 235, they are advanced by the pincers 111 to a segment 185 of the indexing table and then released by the pincers as they pass downwardly on an inclined segment 186 from which they slide onto a belt or other conveyance 190 which removes the filled cartons from the machine. The pincers are consequently free to pass into the first station without interference by the filled cartons, and because of the inclined slides, the cartons are not dropped on the belt 190 when released by the pincers.

*Operation of the machine*

Figure 29:
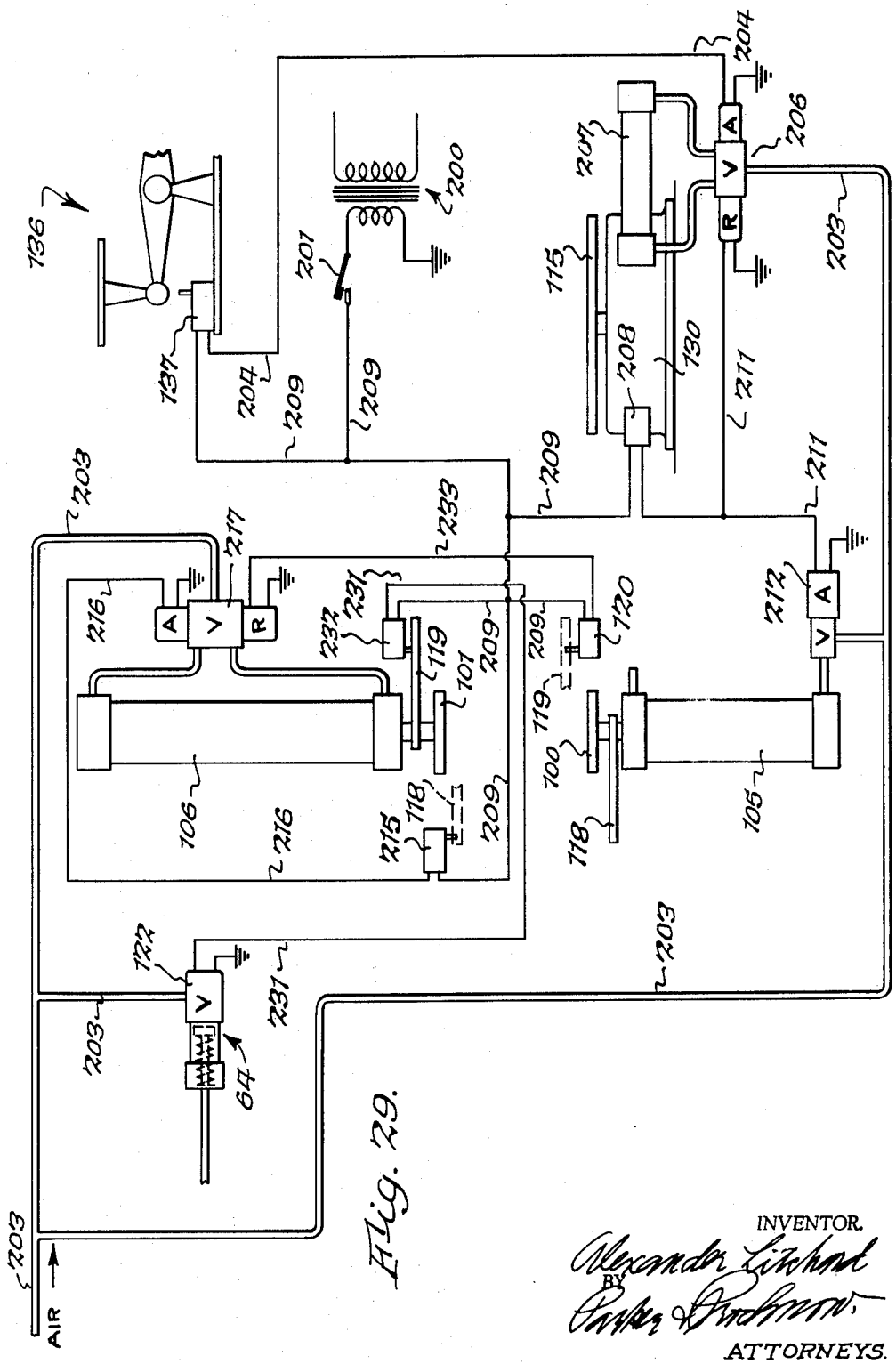
FIG. 29 is a diagrammatic view showing the connections between the various instrumentalities for automatically operating my improved machine.

The sequence of steps in the operation of the machine will be understood by examination of FIG. 29 on which the electric power for operating the machine is derived from a transformer 200 having a low voltage winding. One terminal is grounded while the other connects with a switch 201 which when closed supplies current to a line 209, this being the current supply line to all of the various solenoid-operated valves for operating the machine.

When the scale switch 137 is closed by a carton having proper weight, current flows from the line 209 to a line 204 to the ADVANCE solenoid A of the valve 206 and then to ground, completing the circuit. The now energized ADVANCE solenoid A permits compressed air from the supply line 203 to enter the cylinder 207 and advance the table 115 to a position 90 degrees clockwise from its previous position, thereby advancing all of the cartons one-quarter turn to their next station. As soon as the piston and its drive mechanism reaches its extreme advance position, a switch 208 is closed permitting current to flow from supply line 209 and line 211 to the RETRACT solenoid R of the valve 206, which then supplies compressed air from the line 203 into the other side of the cylinder 207, thus retracting the piston and readying it for its next advance movement. Also current flows from the switch 208 and line 211 to the advance solenoid A of valve 212 on the end of the backing plate cylinder 105, advancing backing plate 100 upwardly toward the ram 101, clamping a carton blank 36 therebetween. As this takes place, a switch arm 118 connected to the piston rod of the backing plate 100 closes a switch 215, supplying current to a line 216 to the ADVANCE solenoid A of an air valve 217 of the ram cylinder 106. This advances the ram 101, the carton blank 36 and the back-up plate 100 downwardly through the carton forming die 103, forming the carton and delivering it to the elevation of the stationary indexing table. The valve 212 of the cylinder 105 is such that after the piston delivers its stroke, the solenoid is deenergized and air can slowly bleed out of the cylinder and valve so as to allow the piston of cylinder 106 to move it down to its retracted position.

Also, when the ram 101 moves downwardly, a switch arm 119 closes a normally open switch 232 allowing current from the line 209 to flow through the line 231 to the solenoid valve 122 of the air motor 64 and to ground. This valve lets air into the motor 64 advancing its piston and the suction cup 71 mounted thereon to contact a carton blank 36 in the magazine. At the bottom of the stroke of the ram 101, the arm 119 engages a switch 120 which allows current to flow from the line 209 into the line 233 and to the RETRACT solenoid R of the valve 217 and then to ground, thereby energizing it and causing the air valve 217 to reverse and let air from the line 203 into the bottom of the cylinder 106, thus retracting it upwardly, where it awaits its next actuation. At the the same time, when it returns, the switch arm 119 again engages the switch 232, thus opening it and deenergizing the solenoid valve 122, permitting the spring of the air motor 64 to pull out of the magazine a carton blank 36 and allow its delivery under the ram 101.

It will be noted that for each one-quarter turn of the table 115, a formed box will be started on its way around the indexing table to its fill and weigh station 135, a fully weighed carton will be moved to its closing station 235 and a closed carton will be discharged onto the conveyor 190.

The delivery of the carton blank 36 to a position under the ram 101 is accomplished by the aforementioned gear 94 and rack 93. The closing of the carton is also accomplished by the aforementioned gear 147 and rack 146. The gears 94 and 147 are driven in timed relation to each other and with the back-up plate 100 through the aforementioned sprockets 96, 148 and the chains 97 and 149 to sprockets 297 and 349 on a shaft 298 which carries a gear 229 driven by a rack bar 230 connected to the back-up plate 100 and powered by the piston rod of the cylinder 105, all of the rack bars 93, 146 and 230 thus moving in synchronized motion and performing their operation at the same time.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A carton handling machine including a magazine for flat carton blanks, feed means for removing the blanks one at a time from said magazine and passing them between a ram and a backing plate, forming means for bending the sides of the blank upwardly from the base and interlocking them, said backing plate positioning the carton in operative relation to an indexing table, means for moving said carton into a filling station, weighing station and a lid-closing station, means at said lid-closing station for interlocking said lid with a side of the carton, and means for discharging the closed carton from the machine, pneumatic pressure means acting on said backing plate to move the same to said ram, said ram pressing said backing plate into carton-positioning device against reduced pneumatic pressure acting on the backing plate, and a pressure relief valve for gradually discharging fluid from said pneumatic pressure means acting on said backing plate while the same is lowered.

2. In a carton handling machine having means for forming a blank into a carton having a lid in upright position, an indexing table on which the formed carton is advanced, a weighing scale at one station of said indexing table upon which the carton is supported while being filled, an electric switch closed by said scale when the carton is filled to complete a circuit, means actuated by said circuit for advancing the carton to a lid-closing station, and a closure plate mounted on said lid-closing station and movable downwardly into engagement with the lid for moving the lid into closing position, means mounted on said closure plate for interlocking parts of said lid with a side of the carton, and means for discharging the closed carton from the machine, said means mounted on said closure plate including a key having a part movable into engagement with the front wall of the carton to move a part thereof inwardly to open slots therein, and parts on said key for guiding parts of said tucking extension into said slots, said key having a recess on the face thereof adjacent to the front of the carton and into which a part of said lid enters and which bends said part downwardly into position approximately parallel to the front wall of the carton, said key guiding said part into position to interlock with said front wall.

3. A carton handling machine according to claim 2 and including mechanism acting on said key after the lid has been locked in place for moving said key in a direction substantially perpendicular from said container to release said container while said key is moved upwardly.

4. In a carton handling machine having means for forming a blank into a carton having a lid in upright position, an indexing table on which the formed carton is advanced, a weighing scale at one station of said indexing table upon which the carton is supported while being filled, an electric switch closed by said scale when the carton is filled to complete a circuit, means actuated by said circuit for advancing the carton to a lid-closing station, a fixed member with which said lid passes into engagement during the movement of the carton from the scale station and which bends the lid partly toward closing position, a closure plate mounted at said lid-closing station and movable downwardly into engagement with the lid for moving the lid into closing position, means mounted on said closure plate for interlocking parts of said lid with a side of the carton, means for discharging the closed carton from the machine, said lid having a tucking extension formed to cooperate with the front of the carton to lock the lid in closed position, keys on said closure plate movable into engagement with said tucking extension during the movement of the closure plate into its final position, for bending said tucking extension into position for interlocking with the front wall of said carton, said keys having recesses for receiving parts of said tucking extension, and a downwardly extending plate on said closure plate which engages said tucking extension and moves it into said recesses of said keys.

References Cited by the Examiner
UNITED STATES PATENTS

| | | | |
|---|---|---|---|
| 1,935,269 | 11/33 | Jones | 53—186 |
| 2,084,533 | 6/37 | Lerner | 53—186 |
| 2,651,898 | 9/53 | Kimball | 53—186 |
| 2,781,620 | 2/57 | Hopkins et al. | |
| 2,790,287 | 4/57 | Kraft et al. | 53—195 X |
| 2,860,549 | 11/58 | Mancuso et al. | 53—186 X |
| 2,899,783 | 8/59 | Otto | 53—236 X |

FRANK E. BAILEY, *Primary Examiner.*

WILLIAM B. PENN, BERNARD STICKNEY,
*Examiners.*